(12) United States Patent
Legros et al.

(10) Patent No.: US 12,553,931 B2
(45) Date of Patent: Feb. 17, 2026

(54) MEASURING METHOD AND SINGLE-TORUS LOOP OHMMETER WITH AC LEAKAGE FLUX COMPENSATION

(71) Applicant: CHAUVIN ARNOUX, Asnieres-Sur-Seine (FR)

(72) Inventors: Philippe Legros, Asnieres-Sur-Seine (FR); Jerome Adam, Asnieres-Sur-Seine (FR)

(73) Assignee: CHAUVIN ARNOUX, Asnieres-sur-Seine (FR)

( * ) Notice: Subject to any disclaimer, the term of this patent is extended or adjusted under 35 U.S.C. 154(b) by 160 days.

(21) Appl. No.: 18/620,119

(22) Filed: Mar. 28, 2024

(65) Prior Publication Data
US 2024/0329106 A1 Oct. 3, 2024

(30) Foreign Application Priority Data
Mar. 29, 2023 (FR) .................................. 2303021

(51) Int. Cl.
*G01R 27/18* (2006.01)
*H01F 27/00* (2006.01)

(52) U.S. Cl.
CPC ............ *G01R 27/18* (2013.01); *H01F 27/006* (2013.01)

(58) Field of Classification Search
CPC ......... G01R 27/18; G01R 27/20; H01F 27/42; H01F 27/006
USPC ........................................................ 324/600
See application file for complete search history.

(56) References Cited

U.S. PATENT DOCUMENTS

| | | | | |
|---|---|---|---|---|
| 3,041,874 A | * | 7/1962 | Saxl .......................... | G01D 5/22 |
| | | | | 73/862.331 |
| 4,223,265 A | * | 9/1980 | Simmen .................. | G01R 23/20 |
| | | | | 324/127 |
| 4,816,624 A | * | 3/1989 | Perrissin ................ | H02B 11/26 |
| | | | | 218/71 |

(Continued)

FOREIGN PATENT DOCUMENTS

| | | |
|---|---|---|
| CN | 110007133 B | 3/2022 |
| CN | 110824229 B | 4/2022 |

(Continued)

OTHER PUBLICATIONS

French Search Report from Corresponding French Patent Application No. FR2303021, Oct. 30, 2023.

*Primary Examiner* — Christopher P Mcandrew
(74) *Attorney, Agent, or Firm* — Workman Nydegger

(57) ABSTRACT

A single-torus ohmmeter for measuring a loop impedance Zx, includes a single transformer having a primary winding of Np coils and a secondary winding of a single coil forming the measurement loop, in which, to compensate for a stray induction produced by an AC leakage current circulating in the measurement loop without canceling a measurement current Ip generating an alternating induction of constant average value for the measurement of the loop impedance Zx, the transformer includes a second secondary winding of Na coils whose output voltage Ub representative of the AC leakage current is delivered to a processing module providing a voltage intended to be added to an alternating measurement voltage Vp in an adder delivering the current to be injected into the primary winding after passage through a voltage-current converter.

9 Claims, 2 Drawing Sheets

(56) References Cited

U.S. PATENT DOCUMENTS

| | | | | |
|---|---|---|---|---|
| 5,278,503 | A * | 1/1994 | Keller | G01R 33/389 |
| | | | | 324/318 |
| 5,371,469 | A * | 12/1994 | Anderson | G01K 7/206 |
| | | | | 324/705 |
| 7,075,288 | B2 * | 7/2006 | Martin | G01R 15/183 |
| | | | | 324/117 R |
| 7,525,297 | B2 * | 4/2009 | Gibellini | H01F 38/32 |
| | | | | 323/356 |
| 2005/0200366 | A1 | 9/2005 | Bougaud et al. | |
| 2005/0212506 | A1 * | 9/2005 | Khalin | G01R 35/02 |
| | | | | 324/127 |
| 2007/0103168 | A1 * | 5/2007 | Batten | G01R 27/16 |
| | | | | 324/527 |
| 2012/0161852 | A1 * | 6/2012 | Curbelo | H03K 17/0828 |
| | | | | 327/513 |
| 2013/0191059 | A1 | 7/2013 | Legros | |
| 2014/0015538 | A1 * | 1/2014 | Laepple | G01R 27/08 |
| | | | | 324/509 |
| 2014/0021939 | A1 | 1/2014 | Dobrenko et al. | |
| 2015/0002163 | A1 * | 1/2015 | Vincent | G01R 27/20 |
| | | | | 324/509 |
| 2021/0001733 | A1 * | 1/2021 | Meins | B60L 53/12 |
| 2022/0082635 | A1 * | 3/2022 | Broeckmann | G01R 15/18 |

FOREIGN PATENT DOCUMENTS

| | | |
|---|---|---|
| CN | 114720744 A | 7/2022 |
| EP | 1566644 B1 | 1/2009 |
| FR | 2824951 A1 | 11/2002 |
| FR | 2985032 A1 | 6/2013 |
| IT | PD20090005 A1 | 7/2010 |
| JP | 2001066329 A | 3/2001 |

* cited by examiner

MEASURING METHOD AND SINGLE-TORUS LOOP OHMMETER WITH AC LEAKAGE FLUX COMPENSATION

TECHNICAL FIELD

The present invention relates to the field of the control of electrical installations and more particularly concerns the measurement of the ground resistances by means of loop ohmmeters.

BACKGROUND

Loop ohmmeters are apparatuses intended to check the conformity of the ground connections of electrical installations or buildings such as illustrated in FIG. 1. They are particularly suitable when the electrical installation has multiple groundings in parallel forming several successive ground loops because the measurement does not require planting auxiliary stakes into the ground or opening a ground connection (ground strap for example) to isolate the electrical installation.

Conventionally, loop ohmmeters involve the use of two transformers magnetically isolated from each other and enclosing the ground connection conductor, one to inject a voltage by induction and the other to measure the current circulating in the loop. The impedance of the ground connection is then deduced from the ratio between this voltage and the measured current.

However, and as shown in FIG. 2, it is known from patent EP1 566 644 B1 filed in the name of the Applicant a single-torus loop ohmmeter which makes it possible to dispense with the current transformer and the magnetic isolation between the two transformers using only a single transformer consisting of a torus with a primary winding Np, used simultaneously for the injection of the voltage and the measurement of the current circulating in the ground loop, and a single-coil secondary winding Ns formed by the ground connection conductor whose loop impedance Zx is to be measured. The application of a setpoint voltage Vp across the primary of the transformer circulates in this primary a measurement current Ip which induces, in the enclosed conductor forming the secondary, the secondary voltage Vs generating the secondary current Is=Vs/Zx circulating in the loop, m being the ratio of the numbers of turns of the secondary winding Ns and of the primary winding Np, i.e. m=Ns/Np.

Given that the voltage applied across the primary Vp is a known quantity, if the transformer were a perfect transformer, it would be sufficient to measure the primary current Ip to know the impedance Zx. But, in reality, the transformer is not perfect and has magnetic flux losses, iron and copper losses and finite magnetic circuit permeability.

Also, FIG. 3 illustrates the equivalent electrical diagram of the actual transformer brought back to the primary on which, Rf represents the resistance equivalent to the iron losses of the transformer, Lµ represents the magnetizing inductance of the transformer, that is to say the image of the non-infinite permeability of the magnetic circuit, If and Iµ represent the components of the magnetizing current of the transformer, Rp represents the resistance of the primary winding, that is to say the image of the copper losses, lp represents the leakage inductance of the primary, that is to say the image of the magnetic flux losses, Rs represents the resistance of the secondary winding, ls represents the leakage inductance of the secondary and Ep represents the actual voltage generating the magnetic flux of the transformer.

This equivalent diagram can be simplified given that the winding Ns being constituted by the loop whose impedance Zx is to be measured, it follows that Ns=1 and ls becomes negligible and can be considered as equal to zero, just as Rs, and that the value of Rp is negligible compared to $ZxNp^2$ hence $Rp \approx 0$.

The equivalent diagram is therefore reduced to the simplified form illustrated in FIG. 4, which allows writing:
$Ip/Vp=1/Z=1/Rf+1/jL\mu\omega+1/ZxNp^2$ Where $\omega=2\pi f$, f being the frequency of the voltage Vp.

The loop impedance measuring method described above therefore requires permanent knowledge of the values of Rf and Lµ to determine Zx. These two values are obtained at no load (open loop) before the installation of the torus around the loop whose impedance Zx is to be measured.

However, these values change as a function of the induction level in the torus which depends on the presence of the AC and DC stray currents circulating in the measurement loop and which must therefore be compensated so that the values remain exploitable during the measurement phase and guarantee the desired measurement accuracy over the desired measurement range.

SUMMARY

The main aim of the present invention is to reduce the influence of the induction in the torus (and mainly on the iron losses whose Rf is the electrical model) due to the presence of stray AC alternating current in the measurement loop (generally at the frequency of the network and of its harmonics).

This aim is achieved by a method for measuring a loop impedance Zx in a single-torus ohmmeter including a single transformer having a primary winding of Np coils and a secondary winding of a single coil forming a measurement loop of impedance Zx, characterized in that, to compensate for a stray induction produced by an AC leakage current circulating in the measurement loop without canceling a measurement current Ip generating an alternating induction of constant average value for the measurement of the loop impedance Zx, said measurement current Ip is added to a current opposite and proportional to the stray induction produced by the AC leakage current, to be re-injected into the primary winding.

This induction can be measured by different methods such as a Hall effect or a Rogowski winding, but according to one advantageous embodiment, the measurement of the stray induction is derived from an output voltage Ub delivered across a second secondary winding of Na coils of the single transformer and having been subjected successively to a low-pass filtering and to an integration.

Thus, by measuring, by any means whatsoever and preferably by a secondary winding, a quantity whose amplitude is correlated to the induction resulting from an AC leakage current, and by compensating for the associated magnetic fields by injecting an AC current into the primary, the influence of this AC leakage current circulating in the measurement loop on the iron losses is reduced.

Preferably, the amplitude of the current injected into the primary winding is set by a shunt resistance.

Advantageously, the measurement of the loop impedance is transmitted to a local measurement box via a wired or wireless communication network then periodically to a remote server via an Internet network.

The invention also relates to a single-torus loop ohmmeter implementing the aforementioned method and including a single transformer having a primary winding of Np coils and a secondary winding of a single coil forming the measurement loop, characterized in that, to compensate for a stray induction produced by an AC leakage current circulating in the measurement loop without canceling a measurement current Ip generating an alternating induction of constant average value for the measurement of the loop impedance Zx, the transformer includes a second secondary winding of Na coils whose output voltage Ub representative of the AC leakage current is delivered to a processing module providing a voltage intended to be added to an alternating measurement voltage Vp in an adder delivering the current to be injected into the primary winding after passage through a voltage-current converter.

Advantageously, the module for processing the output voltage of the second secondary winding consists of a low-pass filter followed by an integrator.

Preferably, the single-torus ohmmeter further includes a switch for activating/deactivating the compensation of the AC leakage current mounted at the output of the second secondary winding.

Advantageously, the ratio between the number of coils Np of the primary winding and the number of coils Na of the winding to the second secondary is equal to one.

According to one preferred embodiment, the transformer is made in the form of a non-opening magnetic sensor left permanently on a ground connection conductor and the loop impedance Zx is transmitted periodically to a remote server via at least one communication network.

BRIEF DESCRIPTION OF THE DRAWINGS

Other characteristics and advantages of the present invention will emerge from the description given below, with reference to the appended drawings which illustrate one exemplary embodiment devoid of any limitation and in which.

DETAILED DESCRIPTION OF THE INVENTION

The principle of the invention is based on a measurement of the induction using a second secondary winding to compensate for its influence on Rf and Lµ. By using this second secondary winding whose output voltage is the derivative of the magnetic flux as an indicator of the AC flux, a proportional current is re-injected into the primary winding to compensate for the disturbing AC flux created by the current to be measured circulating in the measurement loop, without having to interrupt the measurement.

It can be noted that a Hall effect or fluxgate sensor or a Rogowski loop would also have allowed such a measurement of the stray induction produced by the AC leakage current circulating in the measurement loop.

Figure 5:
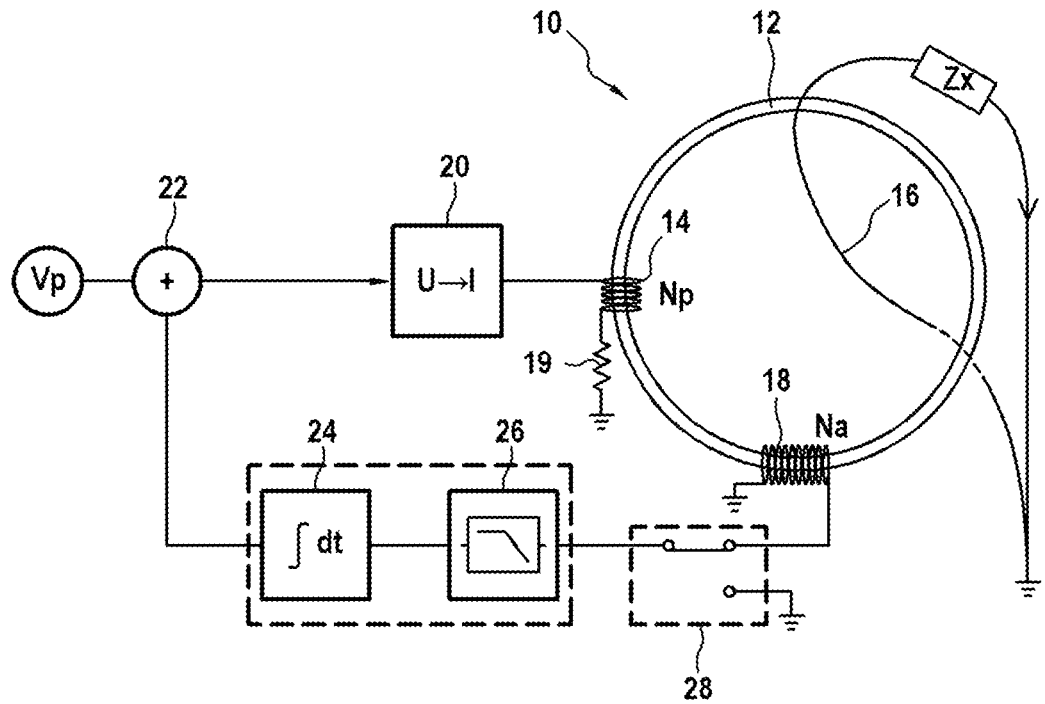
FIG. 5 illustrates a single-torus loop ohmmeter with AC leakage flux compensation according to the invention.

FIG. 5 illustrates the main diagram of this compensation of the alternating current circulating in the measurement loop (hereinafter AC leakage current).

The transformer 10 is illustrated by its torus 12, the primary winding 14 of Np coils, the single-coil Ns secondary winding 16 formed by the measurement loop of the impedance Zx and the second secondary winding 18 of Na coils. Preferably, the ratio between the numbers of coils at the primary winding Np and at the second secondary winding Na is equal to one without this ratio being limiting (it can indeed be greater or less than 1). The current injected into the primary winding 14 and whose amplitude is set by a shunt resistance 19 is derived from a voltage-current converter 20, typically with an operational amplifier, disposed at the output of an adder 22 intended to add a compensation signal to the measurement signal (intended to minimize the non-zero average value of the alternating induction in the torus) and therefore receiving on the one hand the alternating measurement voltage Vp corresponding to the useful voltage for measuring Zx and on the other hand a voltage Ucomp which corresponds to the servo-control set up to compensate for the AC leakage current, and which is taken at the output of an integrator 24 necessary to find a current representing the magnetic field derived from this AC leakage current and itself receiving the output signal from a low-pass filter 26 whose input is connected across the second secondary winding 18, preferably through a two-position switch 28. The low-pass filter 26 followed by the integrator 24 forms a module for processing the output voltage Ub.

It should be noted that by placing the voltage adder before the converter, the use of the voltage-current conversion "function" twice is thus avoided.

It should also be noted that if functionally, adder and converter have been separated, in practice they only form a single hardware component.

Left permanently on an ground connection conductor, that is to say with a transformer forming a non-opening magnetic sensor, the loop ohmmeter according to the invention can permanently monitor the loop impedance Zx, and therefore the ground impedance synonymous with quality of protection at the point of installation of this sensor.

Figure 1:
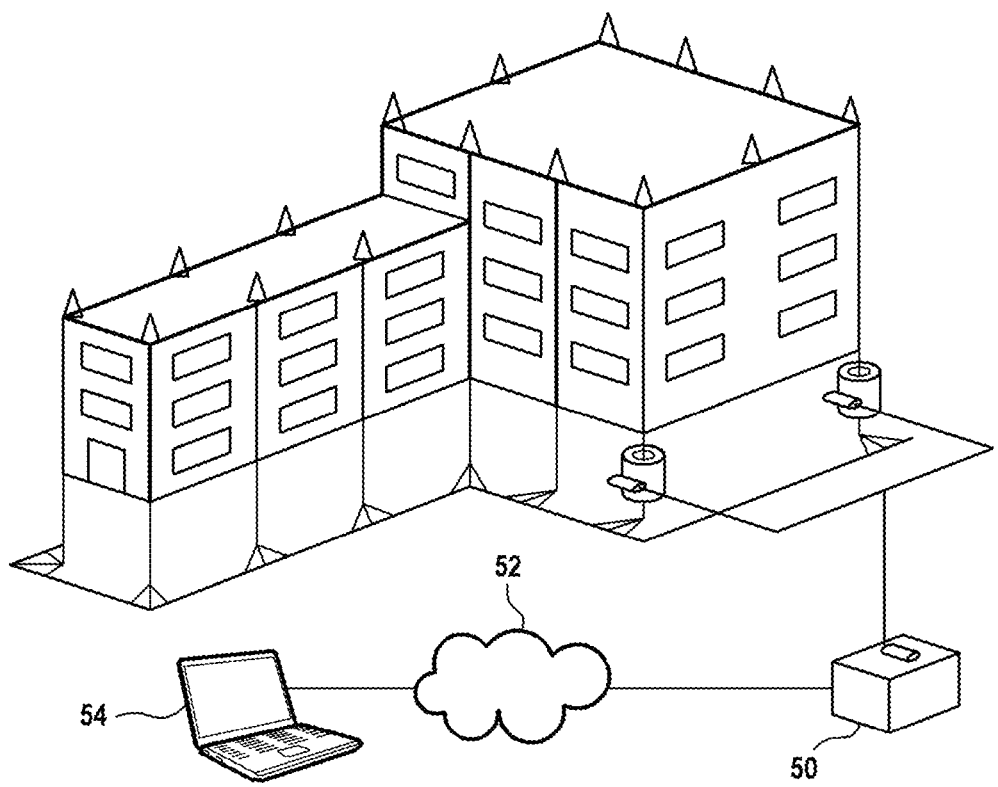
FIG. 1 shows a set of electrical lines including ground contacts connecting various buildings together, FIG. 2 schematically shows a single-torus loop ohmmeter.
Figure 2:
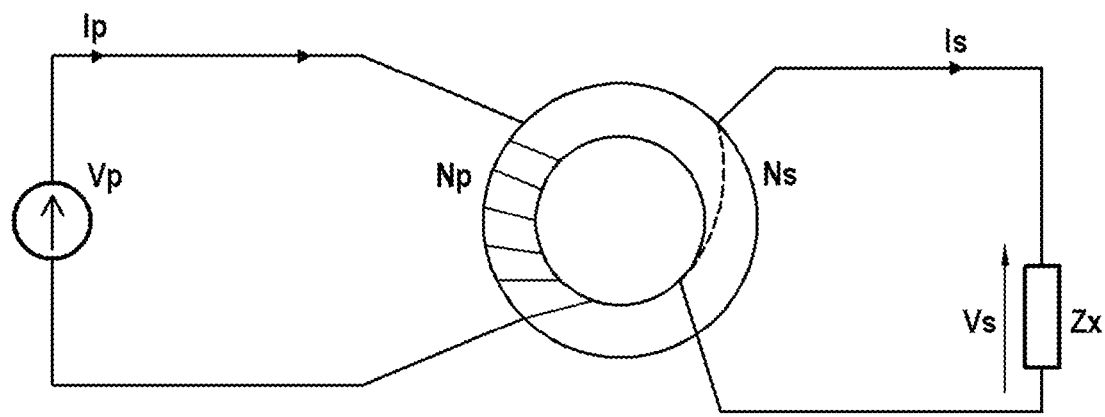
Figure 3:
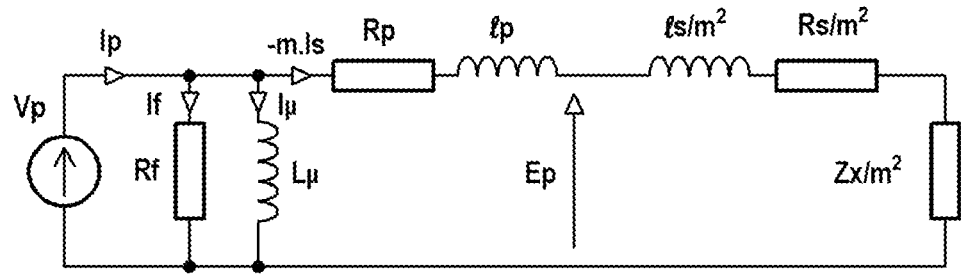
FIG. 3 shows the equivalent electrical diagram of an actual transformer brought back to the primary.
Figure 4:
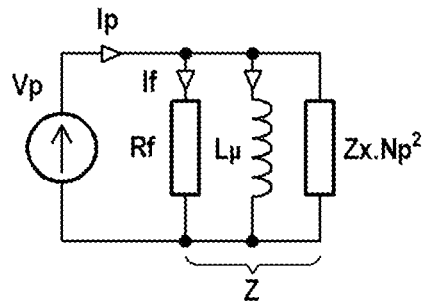
FIG. 4 shows the simplified diagram of the transformer of FIG. 3.

As shown in FIG. 1, it can include its own means of communication in connection via a communication network, advantageously a wireless communication network (of the 3G-5G or Wi-Fi type in particular) or a wired communication network (Ethernet in particular) with the corresponding means of communication of a local measurement box 50 to regularly transmit its impedance measurements to a remote server 52 via the Internet network 54 for example, thus avoiding the need for an operator to travel to ensure the control of the impedance Zx.

With the invention, the AC leakage current is canceled without canceling the measurement current injected for the measurement of the loop impedance Zx. Indeed, the measurement current Ip injected on the primary winding Np must not be impacted by the servo-control of the AC leakage current, hence the presence of the low-pass filtering in the compensation signal of the AC leakage current so that this compensation does not cancel the measurement current. Finally, the torus demagnetization signal being at low frequency, the compensation activation/deactivation switch allows, if necessary, to stop the compensation of the AC leakage current.

The invention claimed is:

1. A method for measuring a loop impedance Zx in a single-torus ohmmeter including a single transformer having a primary winding of Np coils and a secondary winding of a single coil forming a measurement loop of impedance Zx, wherein to compensate for a stray induction produced by an AC leakage current circulating in the measurement loop without canceling a measurement current Ip generating an alternating induction of constant average value for the measurement of the loop impedance Zx, said measurement current Ip is added to a current opposite and proportional to this stray induction produced by the AC leakage current, to be re-injected into the primary winding.

2. The method for measuring a loop impedance Zx according to claim 1, wherein the measurement of the stray induction is derived from an output voltage Ub delivered across a second secondary winding of Na coils of the single transformer and having been subjected successively to a low-pass filtering and to an integration.

3. The method for measuring a loop impedance Zx according to claim 1, wherein the amplitude of the current injected into the primary winding is set by a shunt resistance.

4. The method for measuring a loop impedance Zx according to claim 1, wherein the measurement of the loop impedance is transmitted to a local measurement box via a wired or wireless communication network then periodically to a remote server via an Internet network.

5. A single-torus ohmmeter for measuring a loop impedance Zx, including a single transformer having a primary winding of Np coils and a secondary winding of a single coil forming the measurement loop, characterized in that, to compensate for a stray induction produced by an AC leakage current circulating in the measurement loop without canceling a measurement current Ip generating an alternating induction of constant average value for the measurement of the loop impedance Zx, the transformer includes a second secondary winding of Na coils whose output voltage Ub representative of the AC leakage current is delivered to a processing module providing a voltage intended to be added to an alternating measurement voltage Vp in an adder delivering the current to be injected into the primary winding after passage through a voltage-current converter.

6. The single-torus ohmmeter according to claim 5, wherein the module for processing the output voltage of the second secondary winding consists of a low-pass filter followed by an integrator.

7. The single-torus ohmmeter according to claim 5, further including a switch for activating/deactivating the compensation of the AC leakage current mounted at the output of the second secondary winding.

8. The single-torus ohmmeter according to claim 5, wherein the ratio between the number of coils Np of the primary winding and the number of coils Na of the winding to the second secondary is equal to one.

9. The single-torus ohmmeter according to claim 5, wherein the transformer is made in the form of a non-opening magnetic sensor left permanently on a ground connection conductor and the loop impedance Zx is transmitted periodically to a remote server via at least one communication network.

* * * * *